US008794467B2

(12) United States Patent
Zentner

(10) Patent No.: US 8,794,467 B2
(45) Date of Patent: Aug. 5, 2014

(54) FUEL FILLER DOOR MODULE

(75) Inventor: Christian Zentner, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 244 days.

(21) Appl. No.: 13/262,261

(22) PCT Filed: Jan. 27, 2010

(86) PCT No.: PCT/EP2010/000451
§ 371 (c)(1),
(2), (4) Date: Sep. 30, 2011

(87) PCT Pub. No.: WO2010/112099
PCT Pub. Date: Oct. 7, 2010

(65) Prior Publication Data
US 2012/0111451 A1 May 10, 2012

(30) Foreign Application Priority Data
Apr. 1, 2009 (DE) .......................... 10 2009 015 255

(51) Int. Cl.
*B60K 15/04* (2006.01)
(52) U.S. Cl.
USPC ................. 220/86.2; 296/97.22; 141/313
(58) Field of Classification Search
CPC ................. B60K 15/04; B60K 15/05
USPC ............ 296/97.22; 141/311 R, 313; 220/86.2
See application file for complete search history.

(56) References Cited

U.S. PATENT DOCUMENTS

| 4,898,395 A * | 2/1990 | Kawase ........................ 277/615 |
| 5,839,489 A * | 11/1998 | Ganachaud et al. .......... 141/382 |
| 2005/0005998 A1 | 1/2005 | Miura et al. |
| 2007/0210607 A1* | 9/2007 | Murabayashi et al. .... 296/97.22 |

FOREIGN PATENT DOCUMENTS

| DE | 19827194 A1 | 12/1999 |
| DE | 10026841 A1 | 12/2001 |
| DE | 102005051140 A1 | 5/2007 |
| EP | 0736406 A1 | 10/1996 |
| EP | 1657097 A1 | 5/2006 |

OTHER PUBLICATIONS

German Patent Office, German Search Report for Application No. 102009015255.5, dated Dec. 1, 2009.
UK IPO, British Examination Report for Application No. 1117215.2, dated Apr. 4, 2013.
International Searching Authority, International Search Report for Application No. PCT/EP2010/000451, dated Jun. 4, 2010.

* cited by examiner

*Primary Examiner* — Joseph Pape
(74) *Attorney, Agent, or Firm* — Ingrassia, Fisher & Lorenz, P.C.

(57) ABSTRACT

A tank flap module is provided for installation in a motor vehicle having a basin, which in the region of an elastically deformable floor section has a passage opening for receiving a fuel filler neck. The floor section adjoining the passage opening on a side facing the fuel filler neck has a surface structure provided for reducing the adhesive and/or sliding friction properties.

20 Claims, 2 Drawing Sheets

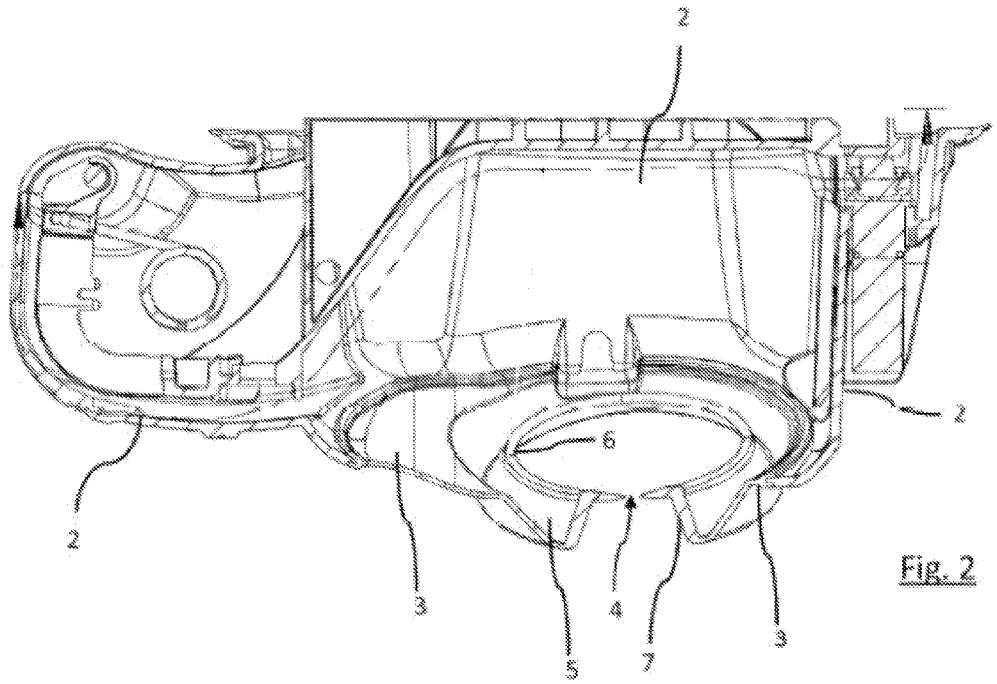
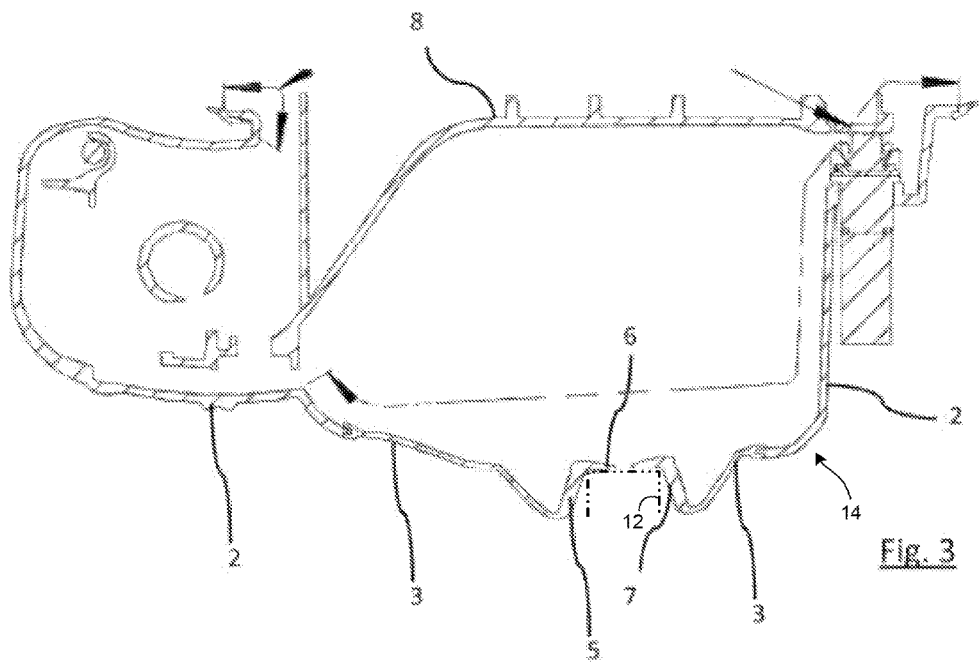

US 8,794,467 B2

FUEL FILLER DOOR MODULE

CROSS-REFERENCE TO RELATED APPLICATIONS

This application is a U.S. National-Stage entry under 35 U.S.C. §371 based on International Application No. PCT/EP2010000451, filed Jan. 27, 2010, which was published under PCT Article 21(2) and which claims priority to German Application No. 102009015255.5, filed Apr. 1, 2009, which are all hereby incorporated in their entirety by reference.

TECHNICAL FIELD

The technical field relates to a tank flap module for installation in a motor vehicle with a dump body, which in the region of an elastically deformable floor section has a passage opening for receiving a fuel filler neck.

BACKGROUND

Tank flap modules for installation in motor vehicles are thoroughly known in the prior art. Thus, the tank flap module described for example in DE 10 2005 051 140 A1 comprises a pot-shaped basin which is substantially constructed of a rigid outer pot part producible through injection molding and an elastic floor apron molded onto the pot part.

In the floor apron, a passage opening for a fuel filler neck of a fuel tank that can be closed is additionally provided. Following installation, the passage opening bears against the fuel filler neck in a sealing manner. The outer pot part and the floor apron jointly form a tank basin. With respect to its assembly on the motor vehicle body or on the fuel filler neck, such a known tank flap module causes problems. This, in particular, when the fuel filler neck is already in its final assembly position prior to the assembly of the tank flap module. The tank flap module, which is to be inserted from the motor vehicle outside into a receiving opening of the body provided for this purpose, then has to be put over the fuel filler neck with its elastically deformable floor apron, particularly with the passage opening formed thereon.

This putting over the floor apron, or of the floor section of the basin proves to be particularly assembly-intensive in practice. Since the passage opening is to enclose the fuel filler neck in a sealing manner, substantial forces have to be exerted in part for its assembly. Here, it is mostly necessary to additionally provide the fuel filler neck or a marginal region adjoining the passage opening of the floor section of the basin with lubricants, such as soapy water or a dry sliding agent so that putting or pulling the floor section over or onto the fuel filler neck is at all possible in the first place.

The use of such lubricants proves to be disadvantageous. On the one hand, a separate operation is required for their application. On the other hand, such lubricants can subsequently attract further undesirable contaminations in the following assembly process.

In contrast, at least one objective is the making available a tank flap module that is improved with respect to its assembly, which can be assembled with reduced effort. In addition, it is at least another objective to fasten the tank flap module on the vehicle or on the fuel filler neck without the use of additional lubricants. A further objective is to lower the assembly and manufacturing effort and assembly costs connected with these in vehicle mass production. In addition, other objectives, desirable features and characteristics will become apparent from the subsequent summary and detailed description, and the appended claims, taken in conjunction with the accompanying drawings and this background.

SUMMARY

A tank flap module is provided for installation in a motor vehicle. It comprises a basin which, in the region of an elastically deformable floor section, for example in the region of a floor apron, has a passage opening for receiving a fuel filler neck. According to the invention, it is provided here that the floor section adjoining the passage opening comprises, at least on a side facing the fuel filler neck, a surface structure provided for reducing the adhesion and/or sliding friction of the floor section.

By creating such a friction-reducing surface structure the alternating adhesion and/or sliding friction of elastically deformable floor section and the fuel filler neck can be reduced in an advantageous manner, so that the use of additional lubricants is largely reduced, preferentially can even be completely dispensed with.

Here, it is more preferable to lower the surface of the floor section that comes to bear against the fuel filler neck with respect to its friction value in such a manner that the use of additional lubricants for the assembly of the tank flap module can be almost completely omitted. In this manner, the separate operation, namely providing regions of floor section and fuel filler neck rubbing against each other with a lubricant or sliding agent can be dispensed with.

Through the reduction or the complete omission of lubricants or sliding agent a contamination of the working region of the assembler can be better counteracted, which can have an advantageous effect on the further production sequence of the motor vehicle.

According to an embodiment it is provided that the basin is designed as two-component plastic injection molding. Here it is more preferably provided that the floor section of the basin is formed of a comparatively soft and flexibly deformable plastic, while the remaining basin comprises a comparatively hard and inflexible plastic.

Through a two-component injection molding process and through the specific use of plastic materials suitable in each case the tank flap module can be optimally adapted in different geometrical sections to the requirements prevailing at the respective section.

Here, it is additionally provided that the basin comprises an outer pot part which is adjoined to the inside by the floor section or the floor apron. It is more preferably provided that the pot part with its section facing towards the vehicle outside and away from the floor section can be fastened to a mount of the motor vehicle body provided for this purpose, while the floor section is designed as a type of termination of the pot part protruding to the inside, which additionally extends from the pot part substantially designed cylindrically or pot-like radially to the inside for forming a passage opening for the fuel filler neck which radially tapers compared with the diameter of the pot part.

According to another embodiment it is provided that the floor section at least facing the vehicle outside, i.e., on the side facing the fuel filler neck is completely provided with a friction-reducing surface structure. Since the introduction of the friction-reducing surface structure in the floor section can be carried out almost cost-neutrally, it is preferably provided to provide the entire floor section with said surface structure. The friction-reducing surface structure thus has an adequate size in order to make available the desired sliding and adhesive friction properties for almost any conceivable configuration of basin and fuel filler neck.

According to a further embodiment it is additionally provided that the floor section adjoining the passage opening is designed as bellows-like grommet In that the floor section in radial direction, with respect to the geometry of the fuel filler neck which is preferentially substantially designed cylindrically, does not follow a linear but S-bend like curved or wavy course, the floor section can be moved on the fuel filler neck and elastically deformed in a particularly simple manner for assembly purposes.

It is furthermore embodiment when the basin in the region of the floor section comprises an elastomer and in the region of the pot part adjoining thereto comprises a polypropylene. The elastomer provided for the floor section compared with the polypropylene provided for the pot part is designed comparatively soft and elastically deformable so that putting over or pulling on of the floor section on the already preassembled fuel filler neck can be carried out preferably easily. The configuration of the pot part as polypropylene injection molding serves for an increase of the structural stiffness of the entire basin so that the latter can easily withstand the mechanical loads that occur during the intended usage.

According to an embodiment it is provided that the floor section consists of ethylene propylene diene rubber (EPDR). Such elastomers prove to be particularly suitable for the application purpose according to the invention.

According to another embodiment the friction-reducing surface structure of the floor section is designed textured, roughened, grooved or knurled. The demanded friction-reducing surface structure of the floor section can be created in different manners. Advantageously, the surface structure is introduced in the floor section directly during the injection molding process. To this end, the injection mold or the injection molding tool has a suitable surface structure. Additionally or alternatively it is conceivable to introduce the demanded surface structure following the completed injection molding process by means of erosion or chemical etching in the floor section. Thus, it can be more preferably provided to also form the demanded surface structure or surface contour by means of photo-etching. There, partial coverings are created on the plastic surface so that a corrosive removal can only take place on corresponding clear areas. In addition, it is conceivable to produce the demanded friction-reducing surface structure electroerosively.

According to another embodiment it is more preferably provided that the friction-reducing surface structure of the floor section has a mean roughness Ra of approximately 1 µm to approximately 10 µm, preferentially of approximately 2 µm to approximately 7 µm, most preferentially of approximately 3 µm to approximately 6 µm. According to a further configuration of the invention it is provided that the texture has a mean roughness value between approximately 4.5 µm and approximately 6.3 µm and/or a mean peak to valley height between approximately 25 µm and approximately 37 µm.

BRIEF DESCRIPTION OF THE DRAWINGS

The present invention will hereinafter be described in conjunction with the following drawing figures, wherein like numerals denote like elements, and:

FIG. 2 is a perspective representation of the partially sectioned tank flap module according to FIG. 1; and FIG. 3 is a cross section through the tank flap module according to FIG. 2.

DETAILED DESCRIPTION

Figure 1:
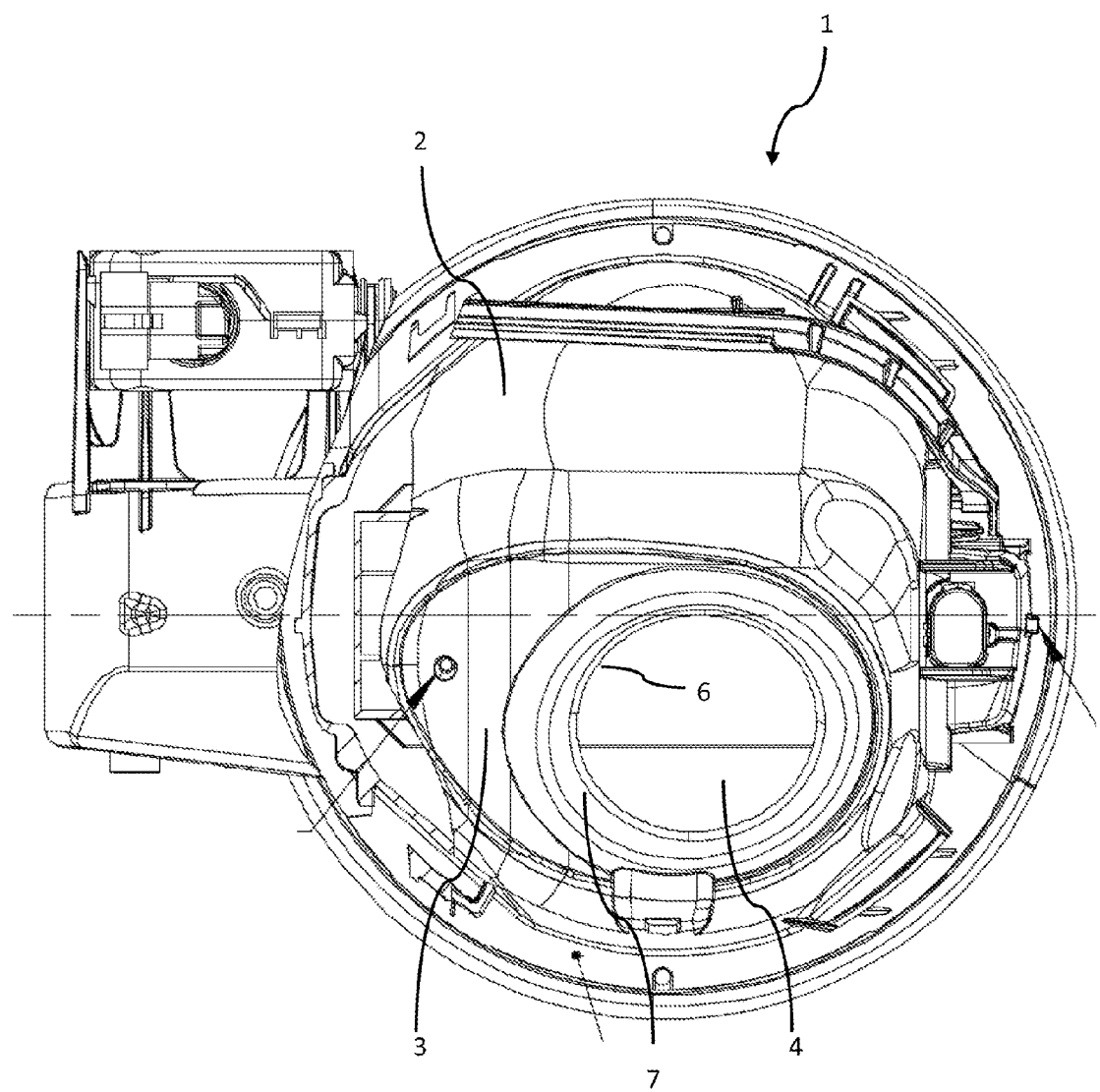
FIG. 1 is a top view of the tank flap module seen from the vehicle inside.

The following detailed description is merely exemplary in nature and is not intended to limit application and uses. Furthermore, there is no intention to be bound by any theory presented in the preceding background or summary or the following detailed description.

The tank flap module 1 shown in the FIG. 1 to FIG. 3 is a two-component construction and towards the motor vehicle outside located at the top in FIG. 2 comprises a pot part 2 and located at the bottom, directed towards the vehicle inside in installation situation, comprises a floor section 3. The transition regions of floor section 3 and pot part 2 are clearly visible in cross section according to FIG. 3. There, the pot part 2 is over molded by the floor section 3 on the inside and outside.

The pot part 2 as well as the floor section or the floor apron 3 can be produced through an injection molding method. While the pot part 2 has a comparatively rigid and inflexible plastic material, for example polypropylene, a comparatively soft and elastically deformable plastic material, preferentially EPDM, is provided for the floor section 3. The outer pot part 2 and the floor section 3 jointly form the basin 14 of the tank flap module. The basin 14 can be closed off towards the outside through a pivotably mounted tank lid 8 shown in cross section in FIG. 3.

For receiving a fuel filler neck (schematically represented in FIG. 3 as fuel filler neck 12, partially inserted), a passage opening 4 which in the present exemplary embodiment is circular in shape is provided on the floor section 3. As is evident by means of FIG. 2 and FIG. 3, the passage opening in its marginal region 6 has a bellows-like curvature 5 that simplifies an elastic deformation of the floor section 3 for assembly purposes.

The marginal region 6 of the floor section 3 adjoining the passage opening 4 comprises a friction-reducing surface structure 7 facing the fuel filler neck, which surface structure preferentially is designed as texture or roughing of the plastic material in that region. Here it is more preferably provided to provide at least those surface sections of the marginal region 6 of the floor section 3, which come to bear against the fuel filler neck with the friction-reducing surface structure. In addition, it can also be provided to provide the entire floor section 3 both inside and outside with the surface roughness or texture.

Through the surface structure 7 reduced in its adhesive and/or sliding friction the entire assembly process, particularly the pushing-on of the floor section 3 onto a fuel filler neck already fixed in final assembly position can be facilitated and simplified. The use of additional lubricants or sliding agents can be advantageously omitted.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A tank flap module for installation in a motor vehicle, comprising:
a basin comprising an elastically deformable floor section defining a passage opening that is configured to receive a fuel filler neck, wherein the elastically deformable floor section adjoining the passage opening on a side facing the fuel filler neck comprises a roughened surface structure.

2. The tank flap module according to claim 1, wherein the basin is a two-component plastic injection molding.

3. The tank flap module according to claim 1, wherein the basin comprises an outer pot part adjoined by the elastically deformable floor section to the inside.

4. The tank flap module according to claim 1, wherein the elastically deformable floor section is completely provided with roughened surface structure.

5. The tank flap module according to claim 1, wherein the elastically deformable floor section is a bellows-like grommet adjoining the passage opening.

6. The tank flap module according to claim 3, wherein the basin in the region of the elastically deformable floor section comprises an elastomer and in a second region of the outer pot part comprises a polypropylene.

7. The tank flap module according to claim 1, wherein the elastically deformable floor section comprises a ethylene propylene diene rubber.

8. The tank flap module according to claim 4, wherein the roughened surface structure of the elastically deformable floor section is textured.

9. The tank flap module according to claim 4, wherein the roughened surface structure is introduced into the elastically deformable floor section by an injection molding.

10. The tank flap module according to claim 4, wherein the roughened surface structure is introduced in the elastically deformable floor section by an etching.

11. The tank flap module according to claim 1, wherein the roughened surface structure has a mean roughness Ra of approximately 1 µm to approximately 10 µm.

12. The tank flap module according to claim 1, wherein the roughened surface structure has a texture with a mean roughness value between approximately 4.5 µm and approximately 6.3 µm.

13. The tank flap module according to claim 1, wherein the roughened surface structure has a mean roughness Ra of approximately 2 µm to approximately 7 µm.

14. The tank flap module according to claim 1, wherein the roughened surface structure has a mean roughness Ra of approximately 3 µm to approximately 6 µm.

15. The tank flap module according to claim 1, wherein the roughened surface structure has a mean peak to valley height between approximately 25 µm and approximately 37 µm.

16. The tank flap module according to claim 1, wherein the friction is a sliding friction.

17. The tank flap module according to claim 1, wherein the friction is an adhesive friction.

18. The tank flap module according to claim 1, wherein the roughened surface structure of the elastically deformable floor section is roughened.

19. The tank flap module according to claim 1, wherein the roughened surface structure of the elastically deformable floor section is grooved.

20. The tank flap module according to claim 1, wherein the roughened surface structure of the elastically deformable floor section is knurled.

* * * * *